(12) United States Patent
Liu et al.

(10) Patent No.: US 8,898,172 B2
(45) Date of Patent: Nov. 25, 2014

(54) PARALLEL GENERATION OF TOPICS FROM DOCUMENTS

(75) Inventors: Zhiyuan Liu, Beijing (CN); Yuzhou Zhang, Beijing (CN); Edward Y. Chang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/263,984

(22) PCT Filed: May 11, 2011

(86) PCT No.: PCT/CN2011/000825
§ 371 (c)(1),
(2), (4) Date: Oct. 11, 2011

(87) PCT Pub. No.: WO2012/151716
PCT Pub. Date: Nov. 15, 2012

(65) Prior Publication Data
US 2014/0059054 A1 Feb. 27, 2014

(51) Int. Cl.
*G06F 7/00* (2006.01)
*G06F 17/30* (2006.01)

(52) U.S. Cl.
CPC .... *G06F 17/30622* (2013.01); *G06F 17/30616* (2013.01)
USPC .......................................................... 707/742

(58) Field of Classification Search
None
See application file for complete search history.

(56) References Cited

U.S. PATENT DOCUMENTS

| 7,895,210 B2* | 2/2011 | Bohn et al. .................... 707/741 |
| 8,239,844 B2* | 8/2012 | Stefansson et al. ............ 717/149 |
| 8,255,889 B2* | 8/2012 | Stefansson et al. ............ 717/149 |
| 2004/0024720 A1* | 2/2004 | Fairweather .................... 706/46 |
| 2010/0005080 A1* | 1/2010 | Pike et al. ......................... 707/4 |
| 2012/0078918 A1* | 3/2012 | Somasundaran et al. ...... 707/748 |
| 2012/0117008 A1* | 5/2012 | Xu et al. .......................... 706/12 |
| 2012/0330958 A1* | 12/2012 | Xu et al. ....................... 707/738 |

FOREIGN PATENT DOCUMENTS

CN       101359333 B        6/2010

OTHER PUBLICATIONS

Nallapati, R. et al., "Parallelized Variational EM for Latent Dirichlet Allocation: An Experimental Evaluation of Speed and Scalability", Proceedings of 7th IEEE International Conference on Data Mining Workshop on High Performance Data Mining, Omaha, NE, USA, 2007, pp. 349-354.
Newman, D. et al., "Distributed Inference for Latent Dirichlet Allocation," Advances in Neural Information Processing Systems 20 (NIPS2007_672), Proceedings of the 2007 Conference, pp. 1081-1088 (9 pages).

(Continued)

*Primary Examiner* — Robert Beausoliel, Jr.
*Assistant Examiner* — Nicholas Allen
(74) *Attorney, Agent, or Firm* — Remarck Law Group PLC

(57) ABSTRACT

Methods, systems, and apparatus, including computer programs encoded on a computer storage medium, for enhanced parallel latent Dirichlet allocation (PLDA+). A PLDA+ system is a system of multiple processors that are configured to generate topics from multiple documents. The multiple processors are designated as two types: document processors and matrix processors. The documents are distributed among the document processors. Generated topics are distributed among the matrix processors. Tasks performed on the document processors and matrix processors are segregated into two types of tasks: computation-bound tasks and communication-bound tasks. Computation-bound tasks are CPU intensive tasks; communication-bound tasks are network intensive tasks. Data placement and pipeline strategies are employed such that the computation-bound tasks and the communication-bound tasks are distributed to the processors in a balanced manner, and performed in parallel.

23 Claims, 9 Drawing Sheets

(56) References Cited

OTHER PUBLICATIONS

International Search Report and Written Opinion dated Mar. 1, 2012 for PCT International Application No. PCT/CN2011/000825, 6 pages.

Liu, Z. et al., "PLDA+: Parallel Latent Dirichlet Allocation with Data Placement and Pipeline Processing," ACM Transactions on Intelligent Systems and Technology, vol. 2, No. 3, Article 26, Apr. 2011, pp. 26:1-26:18.

* cited by examiner

PARALLEL GENERATION OF TOPICS FROM DOCUMENTS

BACKGROUND

This specification relates to document processing.

An electronic document can have one or more topics. A computer can automatically extract the one or more topics from the electronic document using a type of statistical model known as a topic model. An example topic model is latent Dirichlet allocation (LDA). According to LDA, a topic is a probability distribution of words. For example, a topic that has a specified probability distribution associated with words tabby, purr, and kitten can be a topic on "cat." The computer can analyze the electronic document, including, for example, calculating the probability distribution of each of the words tabby, purr, and kitten as included in the document. The calculated probability distribution can indicate a likelihood that the electronic document is associated with the topic "cat." The topic is abstract. The word "cat" is an arbitrary label of the abstract topic.

In an LDA, each document is modeled as a mixture of K topics, where each topic, k, is a multinomial distribution $\phi_k$ over a W-word vocabulary. For any document $d_j$, its topic mixture $\theta_j$ is a probability distribution drawn from a Dirichlet prior with parameter $\alpha$. For each $i^{th}$ word $x_{ij}$ in $d_j$, a topic $z_{ij}=k$ is drawn from $\theta_j$, and the word $x_{ij}$ is drawn from $\phi_k$. The generative operations for LDA are thus given by $$\theta_j \sim Dir(\alpha), \phi_k \sim Dir(\beta), z_{ij}=k \sim \theta_j, x_{ij} \sim \phi_k, \quad (1)$$

where Dir(*) denotes a Dirichlet distribution; $\alpha$ and $\beta$ each is a Dirichlet prior.

SUMMARY

Enhanced parallel latent Dirichlet allocation (PLDA+) systems and methods are described. A PLDA+ system is a system of multiple processors that are configured to generate topics from multiple documents. The multiple processors are designated as two types: document processors and matrix processors. In this context, the term "processor" refers to a computer configured to perform the actions described below as being performed by a document processor or matrix processor, as the case may be. The computers can be configured to perform the actions by virtue of having software, firmware, hardware, or a combination of them installed on the computers that in operation causes or cause the system to perform the actions. Similarly, one or more computer programs can be configured to perform particular actions by virtue of including instructions that, when executed by one or more computers, cause the computers to perform the actions.

The documents are distributed among the document processors. Generated topics are distributed among the matrix processors. Tasks performed on the document processors and matrix processors are segregated into two types of tasks: computation-bound tasks and communication-bound tasks. Computation-bound tasks are CPU intensive tasks; communication-bound tasks are network intensive tasks. Data placement and pipeline strategies are employed such that the computation-bound tasks and the communication-bound tasks are distributed to the processors in a balanced manner, and performed in parallel.

In general, one aspect of the subject matter described in this specification can be embodied in operations that include extracting a word-topic matrix from a set of one or more documents using one or more document processors and multiple matrix processors. The word-topic matrix includes multiple topics of the set of one or more documents. Each of the topics is defined at least in part by one or more words of a word set. Each of the one or more words is associated with a probability. The word set is created from a word index of the set of one or more documents. The word-topic matrix is defined at least in part by a first dimension corresponding to the one or more topics and a second dimension corresponding to the word set.

The matrix processors include at least a first matrix processor and a second matrix processor. The first matrix processor is configured to store and process a first portion of the word-topic matrix corresponding to a first subset of the word set. The second matrix processor is configured to store and process a second portion of the word-topic matrix corresponding to a second subset of the word set.

Each of the one or more document processors is configured to perform topic extraction operations and matrix exchange operations. The topic extraction operations include sampling the set of one or more documents for one or more first topics using the first portion of the word-topic matrix stored at the first matrix processor. The first topics can include at least a portion of the multiple topics of the set of one or more documents. The matrix exchange operations include at least one of a fetching operation or an update operation. The fetching operation includes fetching, from the second matrix processor, the second portion of the word-topic matrix to be used in sampling the set of one or more documents for one or more second topics. The second topics can include at least a portion of the multiple topics of the set of one or more documents, and can be the same as or different from the first topics. The update operation includes, upon extraction of at least one second topic where the extracted second topic corresponds to a word in the second subset, requesting the second matrix processor to update the second portion of the word-topic matrix using the extracted second topic.

These and other embodiments can optionally include one or more of the following features. The operations further include organizing words in the word set as a circular queue. The one or more document processors include multiple processors. The operations further include configuring a first document processor of the multiple document processors to begin performing topic extraction operations using a word at a first position of the queue; and configuring a second document processor of the multiple document processors to begin performing topic extraction operations using a word at a second position of the queue, where the first position differs from the second position.

The operations can further include allocating words in the word set to the multiple matrix processors according to a weighted round robin schedule. Allocating the words according to the weighted round robin schedule can include determining a weight of each word in the word set; determining a load of each of the multiple matrix processors; sorting the words in the word set according to weights of the words; and iteratively allocating a word having a largest weight to a matrix processor having a least load. Determining the weight for the each word in the word set can include determining a number of document processors on which the word resides. Determining the load of the each of the multiple matrix processors can include determining a sum of weights of words on the matrix processor.

The operations can further include configuring each of the one or more document processors to perform topic extraction operations based on a first word bundle and a second word bundle. The first word bundle can correspond to the first subset of the word set. The second word bundle can correspond to the second subset of the word set. Sampling the set of one or more documents for one or more first topics includes performing Gibbs sampling on the set of one or more documents.

Another aspect of the subject matter described in this specification can be embodied in operations that include allocating a first portion of a word-topic matrix to a first matrix processor. The word-topic matrix includes multiple topics of a set of one or more documents. Each topic includes one or more words of a word set. Each of the one or more words is associated with a respective probability. The word set includes words from a word index of the set of one or more documents. The operations include allocating a second portion of the word-topic matrix to a second matrix processor. The second portion of the word-topic matrix is different from the first portion of the word-topic matrix. The operations include performing, on a document processor, topic extraction operations. The document extraction operations include sampling the set of one or more documents for one or more first topics using the first portion of the word-topic matrix stored at the first matrix processor. The operations include performing, on the document processor, and in parallel with performing the topic extraction operations, matrix exchange operations. The matrix operations include at least one of fetching operations or updating operations. The fetching operations include fetching, fetching, from the second matrix processor, the second portion of the word-topic matrix to be used in sampling the set of one or more documents for one or more second topics. The updating operations include, upon extraction of at least one second topic where the extracted second topic corresponds to a word in the second subset, requesting the second matrix processor to update the second portion of the word-topic matrix using the extracted second topic.

The techniques described in this specification can reduce communication bottlenecks of conventional parallel latent Dirichlet allocation (PLDA). More specifically, computation-bound tasks and communication-bound tasks are performed in parallel to improve the performance of PLDA. In parallel processing, the computation-bound tasks mask communication-bound tasks, such that processing time of the communication-bound tasks does not significantly contribute to the total processing time of topic generation. In addition, the techniques described in this specification allow flexible load balancing among multiple processors, further enhancing the performance. In addition, conventional topic-extraction methods, including PLDA, often maintain all word-topic counts in memory of each processor. The techniques described in this specification distribute the word-topic matrix to multiple matrix processors, reducing memory requirements at each processor.

The details of embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
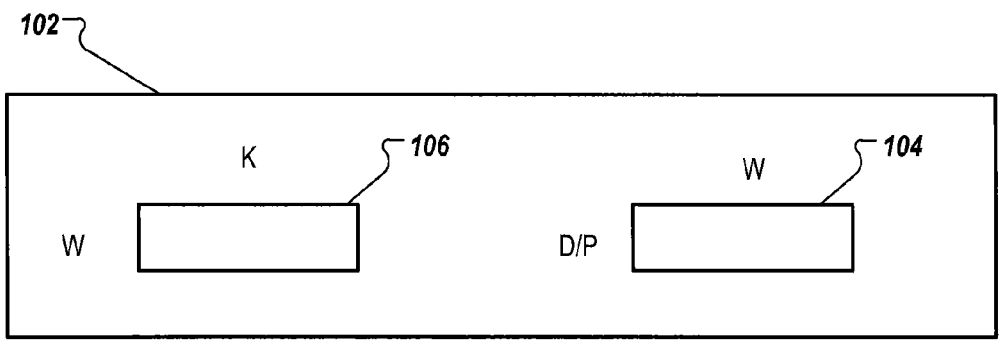
FIG. 1A is a block diagram illustrating an example processor for extracting topics from documents using PLDA technologies.

FIG. 1A is a block diagram illustrating an example processor for extracting topics from documents using PLDA+ technologies. In PLDA+, multiple processors are utilized to extract the topics from the documents. A processor 102 is a representative processor of the multiple processors.

In topic extraction operations, topics are represented as one or more word-topic matrices. Conventional PLDA technologies typically have two characteristics when utilizing multiple processors to extract topics from documents. Each processor maintains an entire word-topic matrix. Each processor sends and receives the entire word-topic matrix to and from other processors. By comparison, in PLDA+, the documents and the word-topic matrices are distributed at the multiple processors. The distributed matrices are synchronized between processors in matrix exchange operations. The topic extraction operations and matrix exchange operations in PLDA+ are performed in parallel, thus improving computation and communication efficiency over the conventional PLDA technologies where the operations are performed serially.

The processor 102 is configured to extract topics from D documents, where D represents an arbitrary number. The D documents are distributed over P processors. The processor 102, being one of the P processors, maintains approximately D/P documents. The D documents correspond to a vocabulary of words in the documents. The vocabulary includes W words. The processor 102 stores a matrix 104 that represents correspondence between the D/P documents and the W words. The matrix 104 is a (D/P)-by-W matrix.

The processor 102 also stores a word-topic matrix 106. The word-topic matrix 106 is a matrix that represents correspondence between K topics over the W-word vocabulary. The word-topic matrix 106 is a K-by-W matrix with topics as one dimension and words as another dimension. Each element in the word-topic matrix 106 can indicate a count of words in a corresponding topic. The word-topic matrix 106 can be constructed through multiple iterations of Gibbs sampling over the D/P documents.

After each iteration of Gibbs sampling, local word-topic matrices are globally synchronized. Local word-topic matrices include the word-topic matrix 106 stored locally at processor 102. The word-topic matrix 106 is globally synchronized when the word-topic matrix 106 is synchronized with matrices stored on other processors.

Figure 1B:
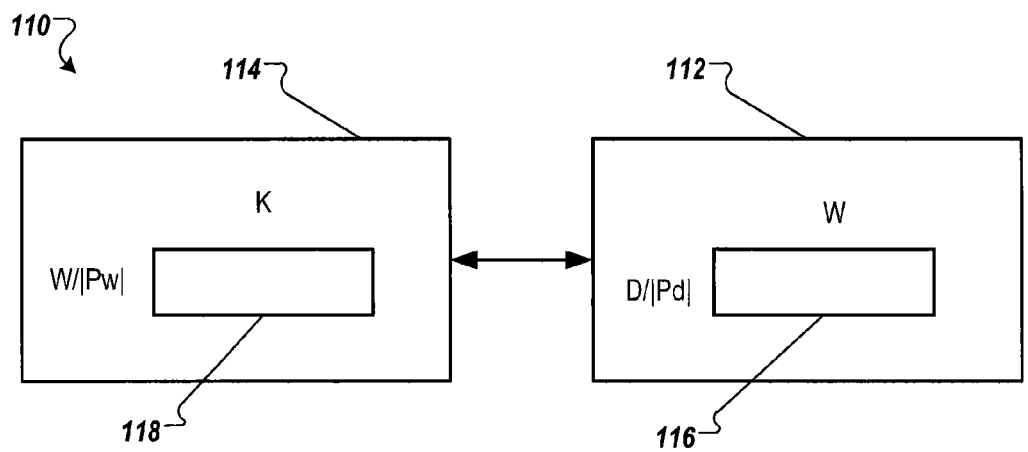
FIG. 1B is a block diagram illustrating an example PLDA+ system.

FIG. 1B is a block diagram illustrating an example PLDA+ system 110. In the PLDA+ system 110, data placement and processing pipeline techniques are utilized to enhance performance of distributed processing over conventional PLDA.

From a high level, the PLDA+ system 110 maintains multiple matrices distributed to various processors in portions, for extracting topics from documents. The multiple matrices include a word-topic matrix and a document-topic matrix. The word-topic matrix, also referred to as a word-topic count matrix, is denoted as $C^{word}$. The word-topic matrix is a data structure having multiple elements where each element $C_{wk}$ is the number of word w assigned to a topic k. The document-topic matrix, also referred to as a document-topic count matrix, is denoted as $C_{doc}$. The document-topic matrix is a data structure having multiple elements where each element $C_{kj}$ is the number of topic k assigned to a document $d_j$. In addition, the PLDA+ system 110 maintains a topic count vector $C_{topic}$ in which each element $C_k$ is the number of topic k assignments in document collection. Given the current state of all but one variable $z_{ij}$, where $z_{ij}$ represents a topic assignment for word $x_{ij}$ (which is the $i^{th}$ word in document $d_j$), the conditional probability of $z_{ij}$ is $$p(z_{ij} = k \mid z^{-ij}, x^{-ij}, x_{ij} = w, \alpha, \beta) \propto \frac{C_{wk}^{-ij} + \beta}{C_k^{-ij} + W\beta}(C_{kj}^{-ij} + \alpha), \quad (2)$$

where –ij indicates that the corresponding word is excluded in the counts; $\alpha$ and $\beta$ each is a Dirichlet prior. Whenever $z_{ij}$ is assigned with a new topic drawn from Eq. (2), $C^{word}$, $C^{doc}$ and $C_{topic}$ are updated. After enough sampling iterations to train a Markov chain, $\theta$ and $\phi$ are estimated as follows:

$$\theta_{kj} = \frac{C_{kj} + \alpha}{\sum_{k=1}^{K} C_{kj} + K\alpha}; \phi_{wk} = \frac{C_{wk} + \beta}{\sum_{w=1}^{W} C_{wk} + W\beta}, \quad (3)$$

where $\theta_{kj}$ indicates the probability of topic k given document j, and $\phi_{wk}$ indicates the probability of word w given topic k.

The PLDA+ system 110 includes two types of processors: document processors (Pd processors) and matrix processors (Pw processors). The document processors are processors that can perform tasks including maintaining documents, performing Gibbs sampling operations, and communication operations. D documents are distributed over |Pd| document processors. A document processor 112 is one of the |Pd| processors. The document processor 112 maintains approximately D/|Pd| documents. The document processor 112 maintains a word-document matrix 116. The word-document matrix 116 is a matrix that represents correspondence between the D/|Pd| documents of document processor 112 and the W-word vocabulary of the D documents. The word-document matrix 116 is a (D/|Pd|)-by-W matrix.

Matrix processors are processors each of which can perform tasks including maintaining a portion of a W-by-K word-topic matrix. The W-by-K word-topic matrix is distributed among |Pw| matrix processors. Each matrix processor is allocated a subset of the vocabulary of the W word. A matrix processor 114 stores a partial word-topic matrix 118. The partial word-topic matrix 118 includes a portion of the W-by-K word-topic matrix that corresponds to the subset of the vocabulary allocated to the matrix processor 114. A word dimension of the partial word-topic matrix 118 corresponds to the subset of the vocabulary. The size of the word dimension is determined by the values of W and |P|, the number of the matrix processors. A topic dimension of the partial word-topic matrix 118 corresponds to the K topics. Thus, the partial word-topic matrix 118 is a (W/|Pw|)-by-K matrix.

The document processor 112 performs Gibb samplings iteratively. During each iteration of the Gibbs sampling, the document processor 112 assigns a new topic to a word in topic-finding operations that include three stages: (1) the document processor 112 fetches the word's topic distribution from the matrix processor 114; (2) the document processor 112 performs Gibbs sampling and assigns a new topic to the word; and (3) the document processor 112 updates a matrix processor (the matrix processor 114 or another matrix processor) that maintains the word.

Figure 2:
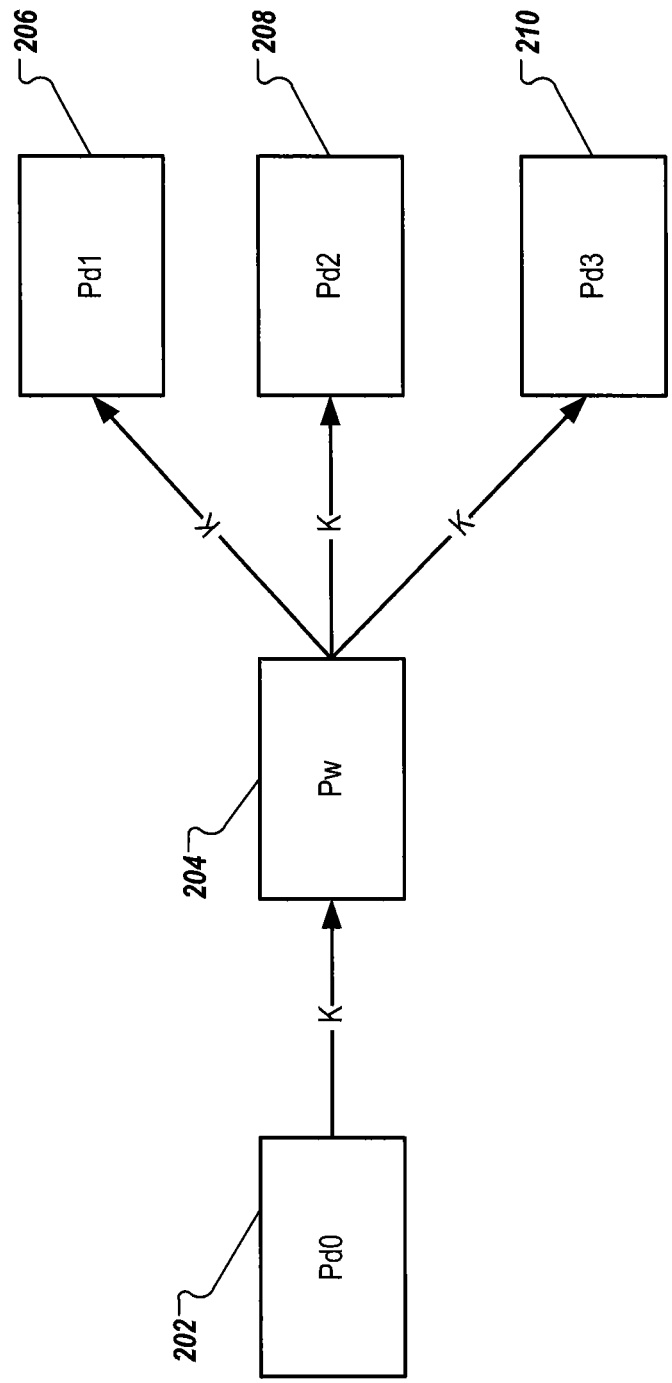
FIG. 2 is a block diagram illustrating an example topic distribution pattern of the data placement techniques.

FIG. 2 is a block diagram illustrating an example topic distribution pattern of data placement techniques. A document processor 202 (Pd0) assigns one or more topics to each of one or more words. The document processor 202 communicates with a matrix processor 204 to synchronize a partial word-topic matrix maintained by the matrix processor 204. The matrix processor 204 updates the partial word-topic matrix maintained by the matrix processor 204 using the topics assigned by the document processor 202 to the words in the subset of words allocated to the matrix processor 204.

Document processors 206, 208, and 210 communicate with the matrix processor 204 through fetch operations. Each of the document processors 206, 208, and 210 fetches the partial word-topic matrix stored at matrix processor 204, rather than an entire K-by-W word-topic matrix. Thus, the updated partial word-topic matrix is propagated to the document processors 206, 208, and 210.

Figure 3A:
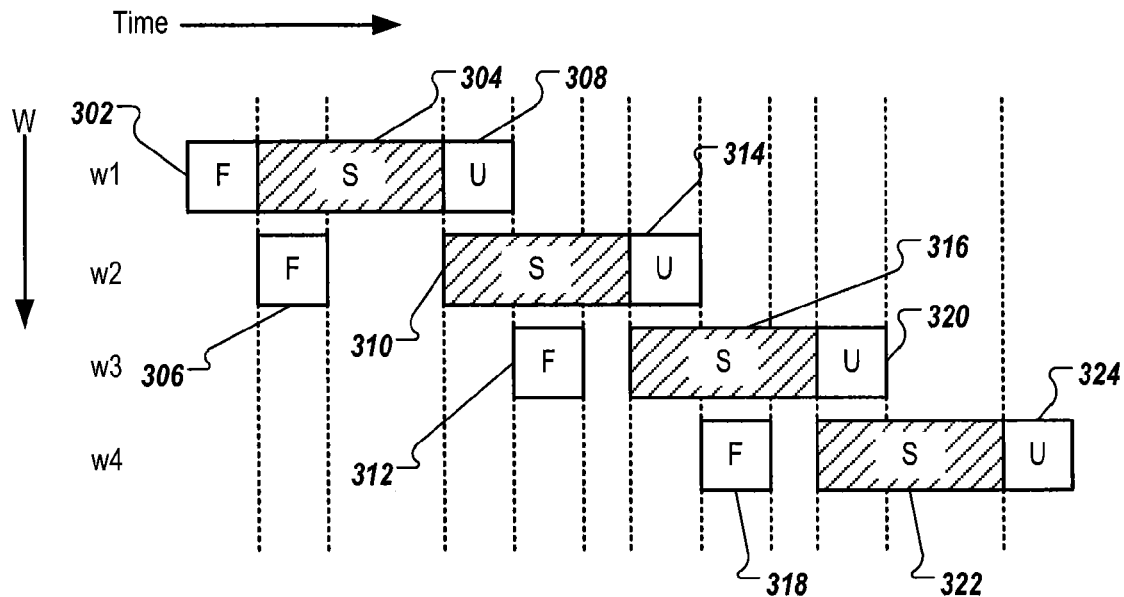
FIGS. 3A and 3B are diagrams illustrating example event sequences of the processing pipeline techniques.
Figure 3B:
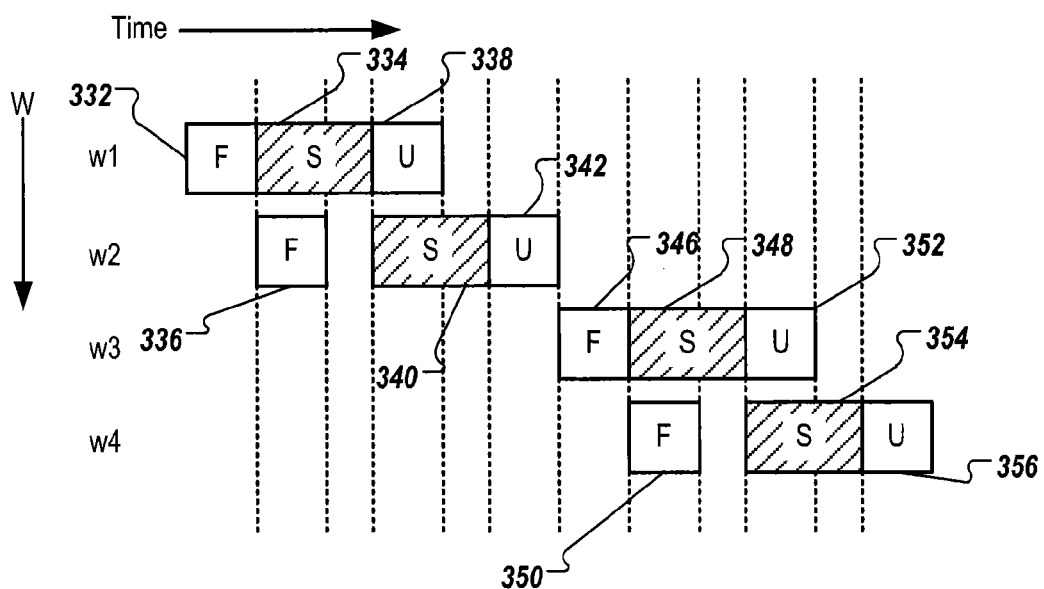

FIGS. 3A and 3B are diagrams illustrating example event sequences of the processing pipeline techniques. As will be shown, in a PLDA+ system, multiple operations are performed in parallel, thereby enhancing the overall performance over a conventional PLDA system. Each of FIGS. 3A and 3B represents an event sequence of Gibbs sampling for four words, w1, w2, w3, and w4. In FIGS. 3A and 3B, a box marked with letter "F" indicates a fetch operation; a box marked with letter "U" indicates an update operation; and a box marked with letter "S" indicates a Gibbs sampling operation.

FIG. 3A demonstrates an example case where sampling time Ts is greater than or equals to the sum of fetch time Tf and update time Tu (Ts>=Tf+Tu). Sampling time Ts is the time a processor takes to perform a task of Gibbs sampling, which is a computation-bound task. Fetch time Tf is time a processor takes to fetch topic distributions. Update time Tu is time a processor takes to update topic distributions. Fetching and updating topic distributions are communication-bound tasks.

In the example shown, a PLDA+ system starts from a first fetch operation 302, where a document processor fetches a topic distribution of word w1 from a matrix processor. Subsequently, the document processor performs a first Gibbs sampling operation 304 on the word w1. In parallel to the first Gibbs sampling operation 304, the document processor performs a second fetch operation 306, where the document processor fetches a topic distribution of word w2.

After the document processor finishes the first Gibbs sampling operation 304 on the word w1, the document processor performs a first update operation 308, where the document processor updates the topic distribution of w1 on the matrix processor. Updating the topic distribution w1 includes sending an update request to the matrix processor. The update request can include results of the first Gibbs sampling operation 304.

The document processor performs a second Gibbs sampling operation 310 on word w2 after the document processor finishes the first Gibbs sampling operation 304; the second operation 310 is performed in parallel to updating the topic distribution of w1. Two operations will be described as occurring in parallel if the time during one operation is performed overlaps to some extent the time during which the other operation is performed. The document processor performs a third fetch operation 312 to fetch a topic distribution of word w3 after the document processor finishes the first update operation 308. The document processor performs the third fetch operation 312 in parallel to the second Gibbs sampling operation 314. The document processor performs a third Gibbs sampling operation 316 on the third word w3, a fourth fetch operation 318, a third update operation 320, a fourth Gibbs sampling operation 322 and a forth update operation 324 in similar manner. When Ts>=Tf+Tu, the total time for the PLDA+ system to process W words is W*Ts+Tf+Tu.

FIG. 3B demonstrates an example case where sampling time Ts is less than the sum of fetch time Tf and update time Tu (Ts<Tf+Tu). In the example shown, a PLDA+ system starts from a first fetch operation 332, where a document processor fetches a topic distribution of word w1. Subsequently, the document processor performs a first Gibbs sampling operation 334 on the word w1. In parallel to the first Gibbs sampling operation 334, the document processor performs a second fetch operation 336, where the document processor fetches a topic distribution of word w2.

After the document processor finishes the first Gibbs sampling operation 334 on the word w1, the document processor performs a first update operation 338, where the document processor updates the topic distribution of w1. In parallel, the document processor performs a second Gibbs sampling operation 340 on word w2 immediately after the document processor finishes the first Gibbs sampling operation 334.

When Ts<Tf+Tu, the document processor performs a second update operation 342 after finishing the second Gibbs sampling operation 340. Subsequently, the document processor performs a third fetch operation 346, where the document processor fetches a topic distribution of word w3. The document processor then performs a third Gibbs sampling operation 348, and in parallel, performs the fourth fetch operation 350 where the document processor fetches a topic distribution of word w4. After finishing the third Gibbs sampling operation 348, the document processor performs a third update operation 352 and a fourth Gibbs sampling operation 354. Finally, the document processor performs a fourth update operation 356. When Ts<Tf+Tu, the total time for the PLDA+ system to process W words is greater than W*Ts+Tf+Tu.

In some implementations, Gibbs sampling operations, fetch operations, and update operations are scheduled such that, as much as possible, Ts>=Tf+Tu. The scheduling utilizes word bundling techniques and low latency communication scheduling techniques to ensure as much as possible Ts>=Tf+Tu. Using word bundling, the Gibbs sampling operations are performed on a group of words to ensure that Ts is sufficiently long. Under low latency communication scheduling, the communication-bound tasks are scheduled in such a way that a computation-bound task is minimally delayed by a communication-bound task. The word bundling techniques and low latency communication scheduling are described in further details below.

Figure 4:
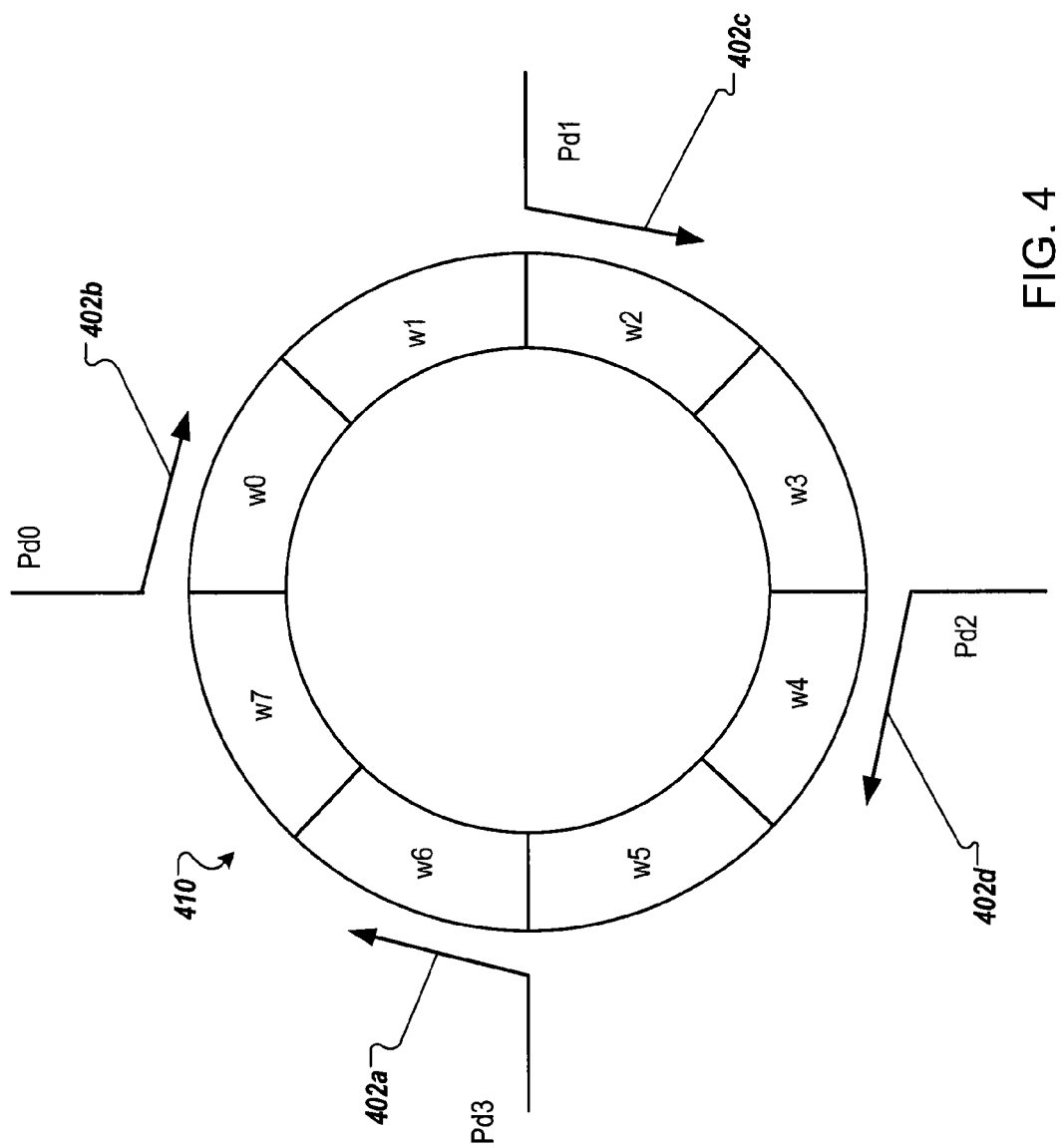
FIG. 4 is a diagram illustrating example word bundling techniques in a PLDA+ system.

FIG. 4 is a diagram illustrating example word bundling techniques in a PLDA+ system. For convenience, the word bundling techniques are described in reference to four document processors, Pd0 through Pd3.

The document processors Pd0 through Pd3 can perform Gibbs sampling in word order 402a-d. A word that occurs several times in the documents of a document processor is processed in a loop. Moreover, words that do not occur frequently are bundle with frequently-occurred words to ensure that Ts is sufficiently long. When the value of Tf+Tu is known, a count of word occurrences to be processed in each Gibb Sampling bundle can be determined. Words are bundled such that Tf+Tu is shorter than Ts to maximize the probability that a fetch is completed by the time a last Gibbs sampling task has completed, thus avoiding adding waiting time.

Each of the document processors Pd0 through Pd3 builds a word index for documents distributed to the document processor. The words in the indices are organized in a circular queue 410. The document processors Pd0 through Pd3 perform Gibbs sampling operations by going around the circular queue 410. To avoid concurrent access to a same word by multiple document processors, each of the document processors is scheduled to begin at a starting position that is different from starting positions of other document processors. For example, in the circular queue 410, which includes words w0 through w7, document processors Pd0 can start a first word from word w0; document processors Pd1 can start a first word from word w2; document processors Pd2 can start a first word from word w4; document processors Pd3 can start a first word from word w6.

In addition to scheduling different document processors to begin at different positions in the circular queue 410, partial word-topic matrices are distributed in a circular fashion on matrix processors. The circular distribution of partial word-topic matrices ensures that, when a communication task is performed at a document processor, the communication task can be served by a corresponding matrix processor rather than multiple matrix processors.

Figure 5A:
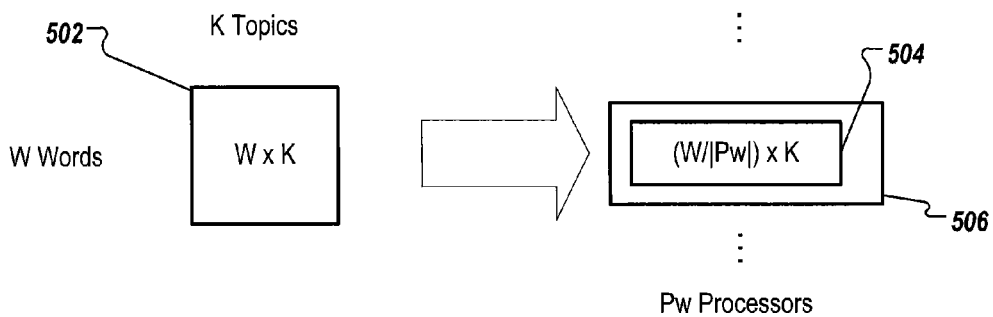
FIGS. 5A and 5B are block diagrams illustrating data placement at various processors in a PLDA+ system.
Figure 5B:
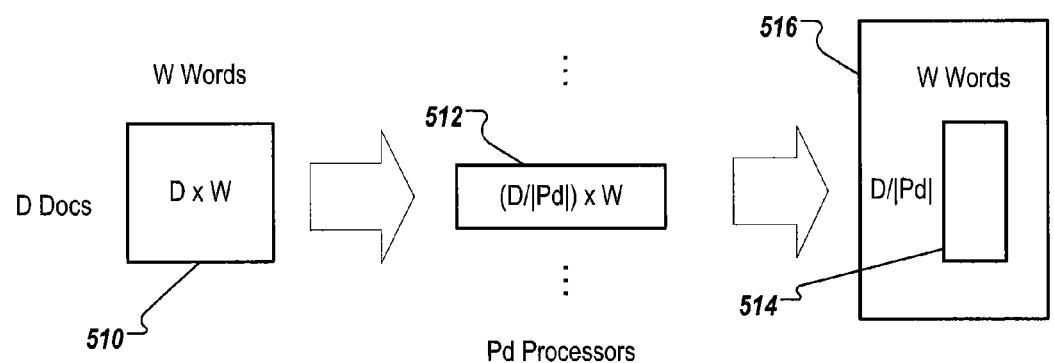

FIGS. 5A and 5B are block diagrams illustrating data placement at various processors in a PLDA+ system. FIG. 5A illustrates word placement on matrix processors. A matrix processor 506 is configured to respond to fetch and update requests from document processors. A W-by-K word-topic matrix 502 is distributed to multiple matrix processors according to words. After the distribution, each matrix processor maintains approximately W/|Pw| words with the words' topic distribution. The matrix processor 506 can store the W/|Pw| words with the word's topic distribution as a (W/|Pw|)-by-K matrix 504.

Word distribution can be utilized to achieve spatial load balancing. The matrix processor 506 and other matrix processors each can be used to handle about the same number of requests in an iteration of Gibbs sampling.

For distributing the W-by-K word-topic matrix 502 to multiple matrix processors, a PLDA+ system maintains two data structures, a word weight data structure and a workload data structure. The word weight data structure is a data structure that stores word weights. A number of document processors on which a word Wi resides, which is also the weight of the word, is denoted as $m_i$. For W words, the PLDA+ system maintains a vector $\vec{m}=(m_1, \ldots, m_w)$. The workload data structure is a data structure that includes information on workload of the matrix processor 506 and on each other matrix processor. The workload of the matrix processor 506 is defined as a sum of weights of all words on the matrix processor 506. The workload of a matrix processor $Pw_i$ is denoted as $l_i$. The work load data structure includes a vector denoted as $\vec{l}=(l_1, \ldots, l_{|P_w|})$.

In some implementations, words are distributed independently and uniformly at random on the matrix processors. In some implementations, a weighted round-robin word placement can be used. In a weighted round-robin word placement, words are sorted in ascending or descending order by weights of the words. A word having the largest weight from the W-word vocabulary (e.g., word Wi), is placed on the matrix processor 506 when the matrix processor 506 has the least workload among matrix processors. Then the workload of the matrix processor 506 is updated. The selection, placement, and update operations are repeated until all words have been placed.

After the PLDA+ system places words with the words topic distributions on the matrix processor 506, the matrix processor 506 builds its responsible word-topic count matrix $C_{|pw}^{word}$ by receiving initial word-topic counts from document processors. Then the matrix processor 506 begins to process requests from the document processors. The requests from the document processors can have three types:

fetch($w_i$, pw, pd): request for fetching topic distribution of word w by document processor pd. For the request, the matrix processor pw will return the topic distribution $C_{w|pw}$ of w, which will be used as $C_{wk}^{-ij}$ in Eq. (2) for Gibbs sampling.

update(w, $\vec{u}$, pw): request for updating topic distribution of word w using the update information $\vec{u}$ on pd. The matrix processor pw will update the topic distribution of w using $\vec{u}$. Update information $\vec{u}$ includes results of Gibbs sampling.

fetch(pw, pd): request for fetching the overall topic counts on matrix processor pw by pd. The matrix processor pw will sum up the topic distributions of all words on pw as a vector $C_{|pw}^{topic}$. Once all $C_{|pw}^{topic}$ are fetched from each matrix processor by pd, they will be summed up and use as $C_{wk}^{-ij}$ in Eq. (2) for Gibbs sampling.

An example algorithm for processing requests from document processors at matrix processor 506 (referred to as pw in the algorithm) is shown below in List 1.

---

List 1. Processing Requests from Document
Processors at a Matrix Processor

---

Variables: $inter_{max}$ //Maximum interval for collecting overall topic counts;
// Initialization Phase
pw receives its responsible words with topic distributions from document processors and build $C_{|pw}^{word}$ ;
// Process requests received from Pd processors
while Not receiving termination message do
    Pick a request r(pd) sent by document processor pd from waiting Queue $Q_{pw}$;
    switch request r do
        case r = fetch(w, pw, pd)
            Return $C_{w|pw}$ to pd;
        End
        case r = update(w, $\vec{u}$, pw)
            $C_{wk|pw} \leftarrow C_{wk|pw} + u_{wk}$,for k = 1,...,K ;
        end
        case r = fetch(pw, pd)
            Collect and return $C_{pw}^{topic}$ to pd;
        end
    end
end

---

In some implementations, the value of maximum interval $inter_{max}$ for fetching overall topic counts from all matrix processors during Gibbs sampling of document processors is set to equal the number of words in the vocabulary.

The matrix processor 506 handles all requests related to the words the matrix processor 506 is responsible for maintaining. To ensure that the requests are served in a timely manner, the PLDA+ system employs a priority scheme in which the requests are sorted by request deadlines. According to a local word processing order in the priority scheme, a document processor can set a communication completion deadline of a fetch request sent from the document processor. The communication completion deadline is a time limitation beyond which the request can be ignored. The communication completion deadline can be represented as various time units. When the document processor sends its requests to matrix processors, the deadline is set in a request header. The matrix processor 506 serves waiting requests based on the deadlines of the waiting requests.

FIG. 5B illustrates document placement on document processors. A word-document matrix 510 is used to represent mappings between words and documents. The word-document matrix 510 is an inverted index that can be used to identify one or more documents from one word.

The word-document matrix 510 can be distributed among multiple document processors in portions. A portion 512 of the word-document matrix 510 can include D/|Pd| documents and W words. A document processor 516 can store a partial document-word matrix 514 that corresponds to the portion 512. The partial document-word matrix 514 is a (D/|Pd|)-by-W matrix.

Figure 6:
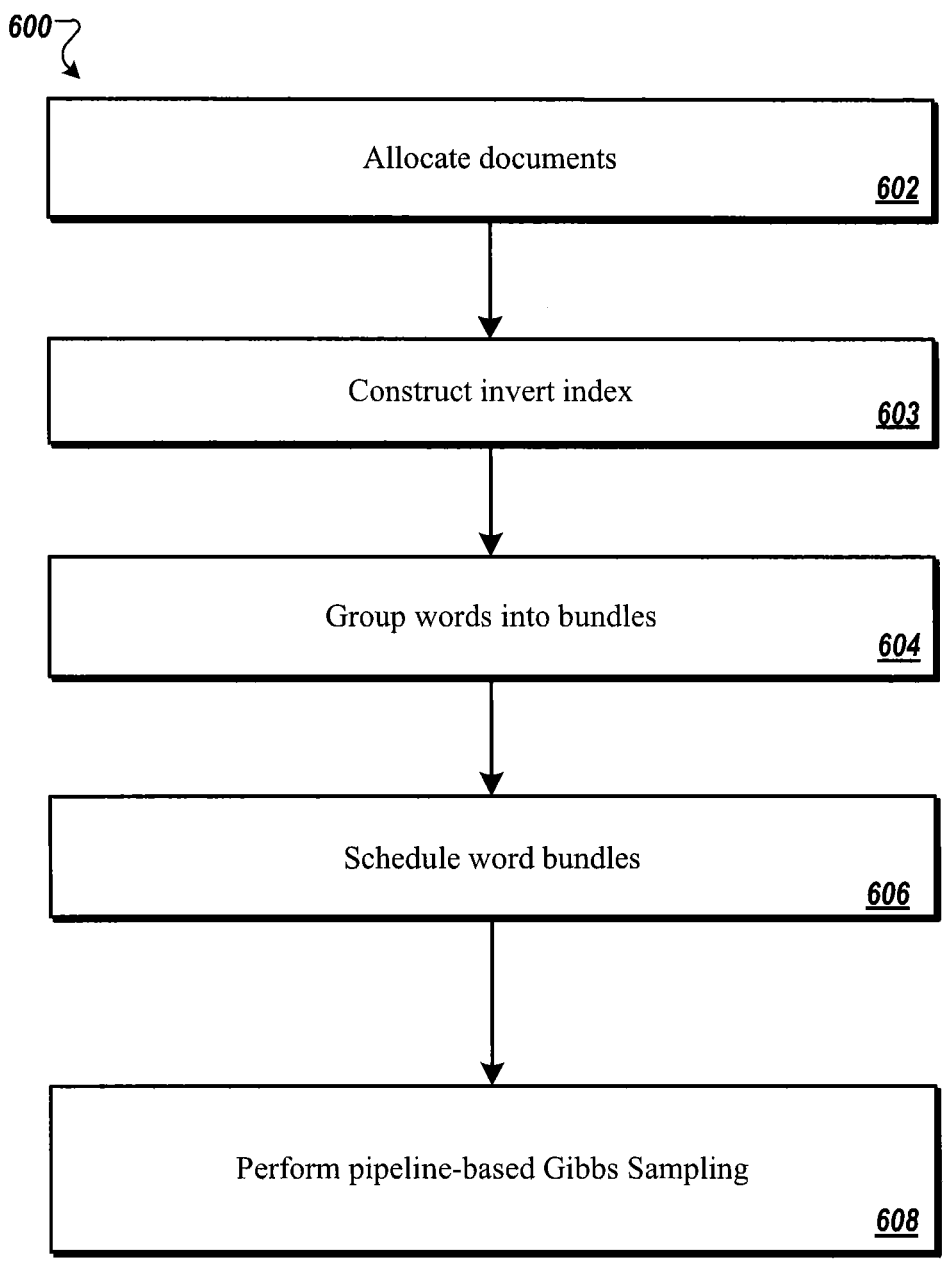
FIG. 6 is a flowchart illustrating an example PLDA+ procedure.

FIG. 6 is a flowchart illustrating an example PLDA+ procedure 600. A PLDA+ system allocates (602) D documents over one or more document processors. The PLDA+ system allocates documents to document processors in a balanced fashion. This is achieved by employing random document allocation. Each document processor is allocated approximately D/|$P_d$| documents. The time complexity of this allocation stage is O(D).

The PLDA+ system constructs (603) an inverted index for documents of each document processor. The invert index is an index based on words. The index structure for each word w is:

$$w \rightarrow \{(d_1,z_1),(d_1,z_2),(d_2,z_1) \ldots \} \qquad (4)$$

When word w occurs in document $d_1$ for n times, there are n entries. In some implementations, the PLDA+ system records all occurrences of word w in $d_1$ as one entry, ($d_1$, {$z_1$, $z_2$}).

The PLDA+ system groups (604) words in a vocabulary into word bundles for Gibbs sampling. Grouping words into word bundles can ensure that the duration of a Gibbs sampling operation is sufficiently long to mask communication operation. The duration of the Gibbs sampling operation is sufficiently long to mask the communication operation when the communication tasks can be completed within the duration of the Gibbs sampling operation. If a word occurs only once on a document processor, performing Gibbs sampling on that word takes a much shorter time than time required to fetch and update the topic distribution of that word and there is no masking.

To ensure masking, the PLDA+ system combines multiple words into a word bundle so that the communication time can be masked by the longer duration of Gibbs sampling time. All words in the word bundle are placed on a same matrix processor, so that one request can fetch topic distributions for all words in the word bundle.

For a document processor, the PLDA+ system bundles words according to the words' matrix processors. The PLDA+ system sorts words placed on a same matrix processor in descending order based on a number of times the words occur. The PLDA+ system then builds an ordered word list. The PLDA+ system then iteratively selects a high frequency word from the head of the word list and one or more low frequency words from the tail of the word list. The PLDA+ system groups the selected high frequency word and the selected one or more low frequency words into a word bundle.

The word bundles thus constructed, a matrix processor will return all words in a word bundle in response to a request to fetch topic distributions.

The PLDA+ system schedules (606) word bundles to minimize communication bottlenecks. In some implementations, the PLDA+ system schedules word bundles according to a random scheduling scheme. In the random scheduling scheme, words in a vocabulary are stored in a circular queue. During Gibbs sampling, words are selected from this queue in a clockwise or counterclockwise order. Each document processor starts from a different offset in the circular queue to avoid concurrent access to the same matrix processor. It is possible that a bottleneck will be formed at some matrix processors when multiple requests arrive at the same time. Thus, some document processors may need to wait for a response before Gibbs sampling is able to start. To reduce the wait, the PLDA+ system registers a deadline in each request, as described in reference to FIG. 4A. A matrix processor processes requests according to the deadlines of the requests. The matrix processor can discard a request if the deadline of the request has been missed. Due to the stochastic nature of Gibbs sampling, occasionally missing a round of Gibbs sampling does not affect overall performance.

The PLDA+ system performs (608) pipeline-based Gibbs sampling iteratively until a termination condition is met. Using the inverted index built in stage 603, each time after a document processor has fetched the topic distribution of a word w from a matrix processor, the document processor performs Gibbs sampling for all instances of w on that document processor. After the Gibbs sampling, the document processor sends back the updated information to a corresponding matrix processor.

For multiple occurrences of a word on a document processor, two communication tasks are performed, one fetch and one update. As shown in Eq. (2), to compute and assign a new topic for a given word $x_{ij}=w$ in a document $d_j$, the PLDA+ system obtains word-topic distribution $C_w^{word}$ for the word w, topic count vector $C^{topic}$, and document-topic distribution $C_j^{doc}$ for the document $d_j$. A document processor maintains the document-topic distribution $C_j^{doc}$. A matrix processor maintains an up-to-date word-topic distribution $C_w^{word}$. The PLDA+ system collects a global topic count vector $C^{topic}$ over all matrix processors. Before assigning a new topic for w in a document, a document processor requests $C_w^{word}$ and $C^{topic}$ from the matrix processors. After fetching $C_w^{word}$ and $C^{topic}$, the document processor performs Gibbs sampling, and assigns new topics for occurrences of w. Then, the document processor returns the updated topic distribution of word w to the responsible matrix processor.

The document processors can have different processing speeds. In a PLDA+ system, a fast document processor can start a next round of pipeline-based Gibbs sampling without having to wait for a slow document processor. Further details of pipeline-based Gibbs sampling are described below in reference to FIG. 7.

Figure 7:
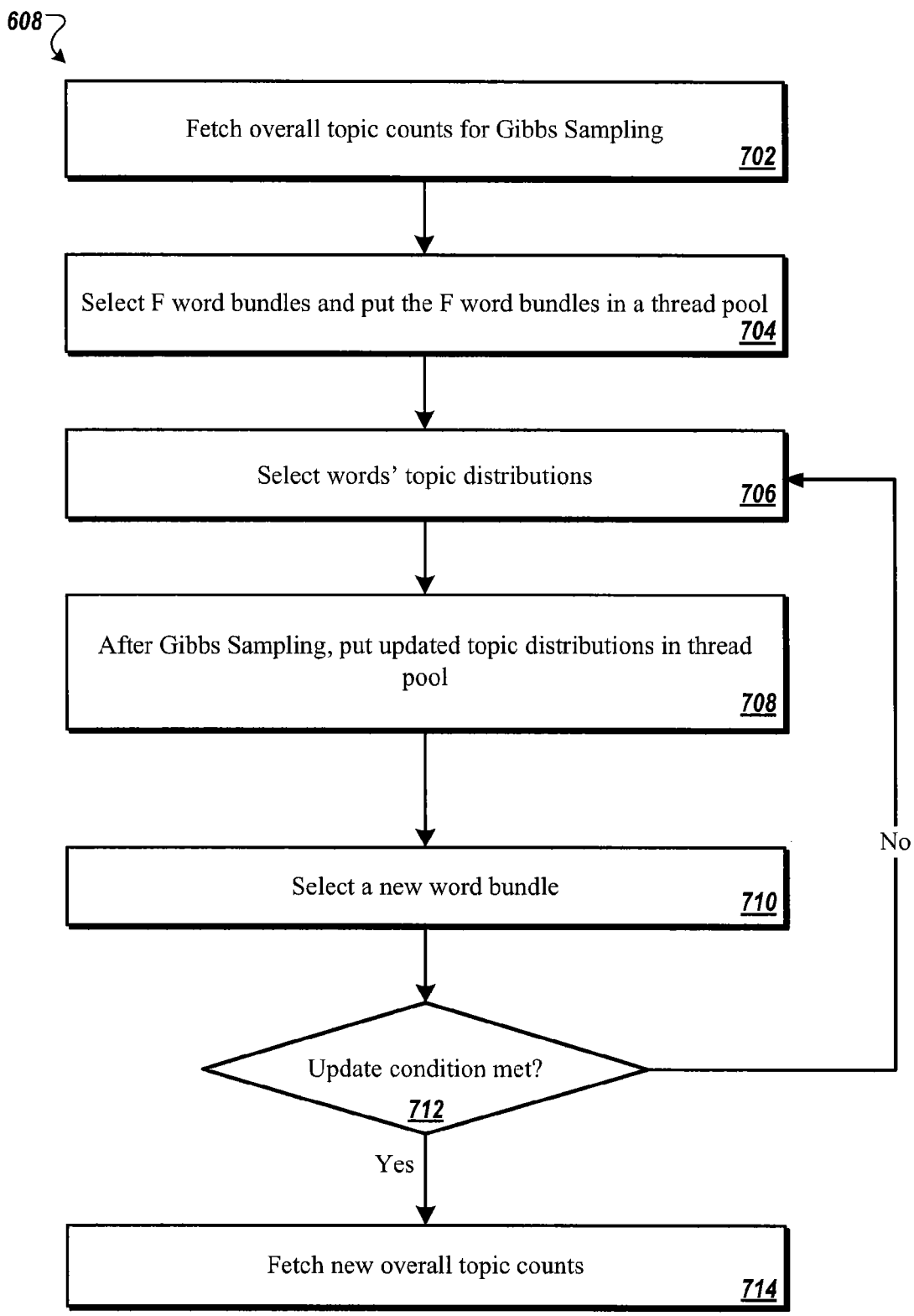
FIG. 7 is a flowchart illustrating an example procedure for performing pipeline-based Gibbs sampling.

FIG. 7 is a flowchart illustrating an example procedure for performing pipeline-based Gibbs sampling. A document processor pd fetches (702) overall topic counts for Gibbs sampling. The document processor pd fetches overall topic distributions $C_{topic}$. In stage 702, the document processor pd submits one or more fetch requests fetch(pw, pd) to each matrix processor. The document processor pd receives responses that include overall topic counts $C_{|pw}^{topic}$, pw∈{0, . . . , |P_w|−1} from the matrix processors. The document processor pd obtains $C_{topic}$ by summing overall topic counts from each matrix processor using the following formula:

$$C^{topic} = \Sigma_{pw} C_{|pw}^{topic} \quad (5)$$

The document processor pd selects (704) F word bundles and puts the F word bundles in a thread pool to fetch the words' topic distributions. The document processor submits one or more fetch requests to a matrix processor. Each of the F word bundles corresponds to a fetch request. The document processor pd receives a response to the request from the matrix processor. The response includes topic distributions. The topic distributions in the response are stored in a waiting queue. The thread pool can send requests and process returned responses in parallel. Multiple requests can be sent at the same time. The requests sent at the same time can be assigned a same deadline.

The document processor pd selects (706) words' topic distributions from the waiting queue to perform Gibbs sampling. Once a response to a fetch request is returned from a matrix processor, the document processor pd can start Gibbs sampling immediately. In some implementations, the number of pre-fetch requests equals F. The value of F is configured to maximize the probability that the waiting queue $Q_{pd}$ always has returned topic distributions of words waiting for Gibbs sampling. In some implementations, F is configured to be larger than the number of threads in the thread pool.

The document processor pd puts (708) updated document distributions into the thread pool of the document processor pd. The thread pool of the document processor pd sends one or more update requests to the matrix processors. The document processor pd selects (710) a new word bundle, and puts the new word bundle in the thread pool. The document processor determines (712) whether an update condition is met. When the update condition is not met, the document processor pd goes to stage 706 to start Gibbs sampling for another word. If the update condition is met, the document processor fetches (714) new overall topic counts.

Figure 8:
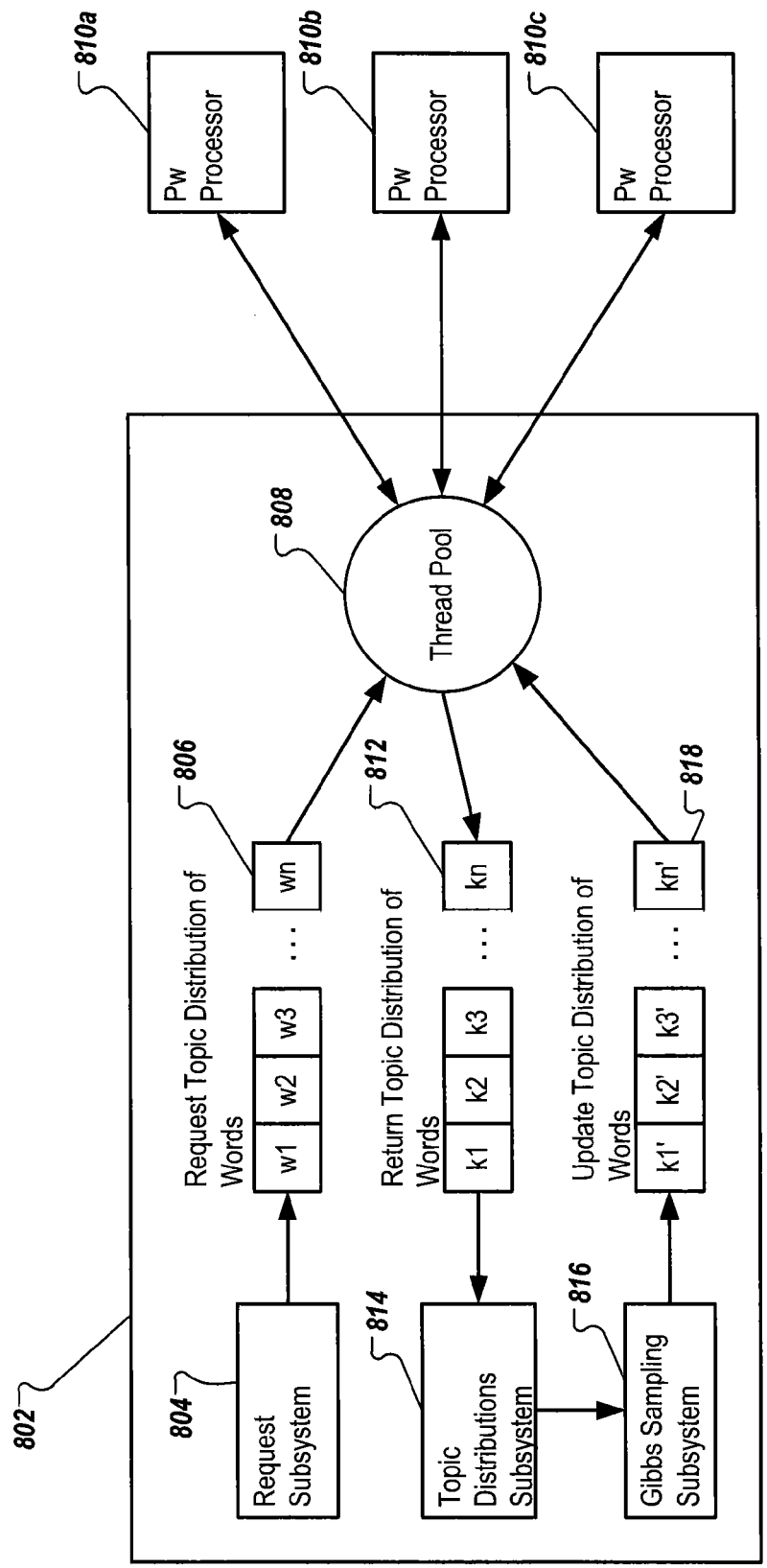
FIG. 8 is a block diagram illustrating a communication scheme of PLDA+.

FIG. 8 is a block diagram illustrating a communication scheme of PLDA+. A document processor 802 includes a request subsystem 802. Request subsystem 804 is configured to generate one or more fetch requests 806. Each of the fetch requests 806 includes a word bundle that includes multiple words w1, w2, . . . wn. The fetch requests 806 are put into a thread pool 808. The thread pool 808 sends the fetch requests 806 to matrix processors 810a, 810b, and 810c. The matrix processors 810a, 810b, and 810c return topic distributions 812 for the words in the word bundle.

Thread pool 808 can be used to prevent blocking by some busy matrix processors. A thread cap value R, which represents a maximum number of threads that are allowed to be held in thread pool 808, caps the number of parallel requests that can be sent to matrix processors 810a, 810b, and 810c. The value of R can be determined by the network environment. The setting of the value of R can be empirically tuned during Gibbs sampling. When the waiting time during an iteration is long, the value of R can be increased in a next iteration. In some implementations, the number of word bundles F, as described in reference to FIG. 7, is set to be proportional to the value of R. For example, in some implementations, F is set to be twice the value of R.

The document processor 802 includes a topic distribution subsystem 814. The topic distribution subsystem 814 puts the topic distributions 812 into a waiting queue. The topic distribution subsystem 814 retrieves topic distributions from the head of waiting queue for Gibbs sampling.

The document processor 802 includes a Gibbs sampling subsystem 816. The Gibbs sampling subsystem 816 is configured to perform Gibbs sampling and update topic distributions 812 and produce updated topic distributions 818. The updated topic distributions 818 are put into one or more update requests and submitted to thread pool 808. The thread pool 808 sends the update requests to matrix processors 810a, 810b, and 810c.

Figure 9:
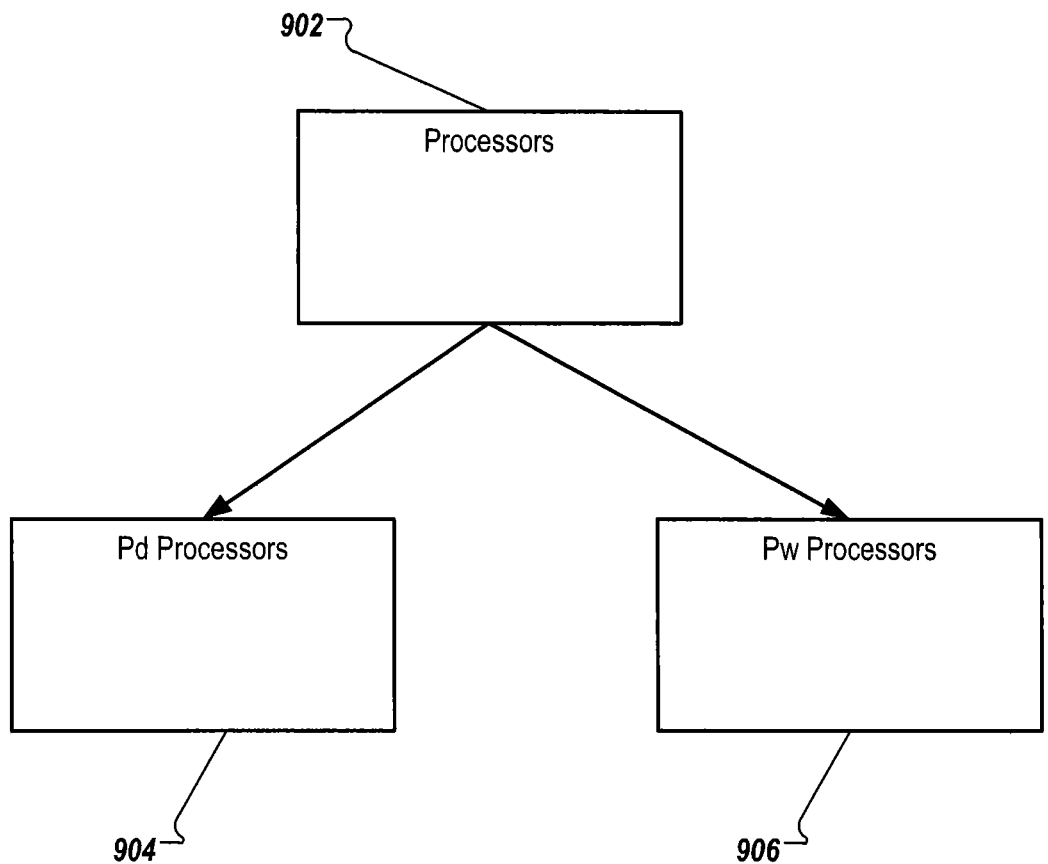
FIG. 9 is a block diagram illustrating techniques of designating processors as document processors or matrix processors in a PLDA+ system.

FIG. 9 is a block diagram illustrating techniques of designating processors as document processors or matrix processors in a PLDA+ system. The PLDA+ system includes multiple processors 902. One or more of the processors 902 are designated as document processors 904. The rest of the processors 902 are designated as matrix processors 906. A proportion of the number of matrix processors 906 to document processors 902, $\gamma=|P_w|/|P_d|$, can be calculated based on average time for Gibbs sampling and average time for communication of the word-topic matrix. When the total time of Gibbs sampling for the whole dataset is $T_s$, the communication time of transferring the topic distributions of all words from one processor to another processor is $T_t$. For document processors 904, the sampling time will be $T_s/|P_d|$. The topic distributions of words are transferred simultaneously to matrix processors 906. The transfer time is $T_t/|P_w|$. The Gibbs sampling operations mask the fetching and updating operations under the following condition:

$$\frac{T_s}{|P_d|} > \frac{2T_t}{|P_w|} \quad (6)$$

When $T_s = W\bar{t}_s$, where $\bar{t}_s$ is the average sampling time for all instances of a word, and $T_t = WT_f = W\bar{t}_u$, where $\bar{t}_f$ and $\bar{t}_u$ is the average fetching and update time for a word, proportion of the number of matrix processors 906 to document processors 902 can be determined as follows:

$$\gamma = \frac{|P_w|}{|P_d|} > \frac{\bar{t}_f + \bar{t}_u}{\bar{t}_s}, \quad (7)$$

where $\bar{t}_f$, $\bar{t}_o$ and $\bar{t}_s$ can be obtained by performing PLDA+ on a small dataset and then empirically set an appropriate $\gamma$ value.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processing unit, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processing units executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processing units suitable for the execution of a computer program include, by way of example, both general and special purpose microprocessors, and any one or more processing units of any kind of digital computer. Generally, a processing unit will receive instructions and data from a read-only memory or a random access memory or both. The essential elements of a computer are a processing unit for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
  extracting a word-topic matrix from a set of one or more documents using one or more document processors and a plurality of matrix processors, the word-topic matrix including a plurality of topics of the set of one or more documents, wherein:
    each of the topics is defined at least in part by one or more words of a word set, each of the one or more words being associated with a respective probability, the word set comprising words from a word index of the set of one or more documents;
    the word-topic matrix is defined at least in part by a first dimension corresponding to the one or more topics and a second dimension corresponding to the word set;
    words in the word set are allocated to the plurality of matrix processors by:
      determining a weight of each word in the word set by determining a number of document processors on which the word resides,
      determining a load of each of the plurality of matrix processors,
      sorting the words in the word set according to weights of the words, and
      iteratively allocating a word having a largest weight to a matrix processor having a least load;
    the matrix processors include:
      a first matrix processor programmed to store and process a first portion of the word-topic matrix corresponding to a first subset of the word set; and
      a second matrix processor programmed to store and process a second portion of the word-topic matrix corresponding to a second subset of the word set, the second subset of the word set being different from the first subset; and each of the one or more document processors is programmed to perform topic extraction operations in parallel to matrix exchange operations, wherein:
the topic extraction operations comprise sampling the set of one or more documents for one or more first topics using the first portion of the word-topic matrix stored at the first matrix processor; and
the matrix exchange operations comprise at least one of:
fetching, from the second matrix processor, the second portion of the word-topic matrix to be used in sampling the set of one or more documents for one or more second topics; or
upon extraction of at least one second topic where the extracted second topic corresponds to a word in the second subset, requesting the second matrix processor to update the second portion of the word-topic matrix using the extracted second topic.

2. The method of claim 1, wherein
the one or more document processors include a plurality of processors; and
the method further comprises:
organizing words in the word set as a circular queue;
configuring a first document processor of the plurality of document processors to begin performing topic extraction operations using a word at a first position of the circular queue; and
configuring a second document processor of the plurality of document processors to begin performing topic extraction operations using a word at a second position of the circular queue, where the first position differs from the second position.

3. The method of claim 1, wherein determining the load of the each of the plurality of matrix processors comprises determining a sum of weights of words on the matrix processor.

4. The method of claim 1, further comprising:
configuring each of the one or more document processors to perform topic extraction operations based on a first word bundle and a second word bundle, the first word bundle corresponding to the first subset of the word set, the second word bundle corresponding to the second subset of the word set.

5. The method of claim 1, wherein sampling the set of one or more documents for one or more first topics includes performing Gibbs sampling on the set of one or more documents.

6. A system comprising:
one or more document processors and a plurality of matrix processors, the system configured to perform operations comprising:
extracting a word-topic matrix from a set of one or more documents using the one or more document processors and the plurality of matrix processors, the word-topic matrix including a plurality of topics of the set of one or more documents, wherein:
each of the topics is defined at least in part by one or more words of a word set, each of the one or more words being associated with a probability, the word set comprising words from a word index of the set of one or more documents;
the word-topic matrix is defined at least in part by a first dimension corresponding to the one or more topics and a second dimension corresponding to the word set;
words in the word set are allocated to the plurality of matrix processors by:
determining a weight of each word in the word set by determining a number of document processors on which the word resides,
determining a load of each of the plurality of matrix processors,
sorting the words in the word set according to weights of the words, and
iteratively allocating a word having a largest weight to a matrix processor having a least load;
the matrix processors include:
a first matrix processor programmed to store and process a first portion of the word-topic matrix corresponding to a first subset of the word set; and
a second matrix processor programmed to store and process a second portion of the word-topic matrix corresponding to a second subset of the word set; and
each of the one or more document processors is programmed to perform topic extraction operations and matrix exchange operations, the topic extraction operations to be performed in parallel to the matrix exchange operations, wherein:
the topic extraction operations comprise sampling the set of one or more documents for one or more first topics using the first portion of the word-topic matrix stored at the first matrix processor; and
the matrix exchange operations comprise at least one of:
fetching, from the second matrix processor, the second portion of the word-topic matrix to be used in sampling the set of one or more documents for one or more second topics; or
upon extraction of at least one second topic where the extracted second topic corresponds to a word in the second subset, requesting the second matrix processor to update the second portion of the word-topic matrix using the extracted second topic.

7. The system of claim 6, wherein
the one or more document processors include a plurality of processors; and
the method further comprises:
organizing words in the word set as a circular queue;
configuring a first document processor of the plurality of document processors to begin performing topic extraction operations using a word at a first position of the circular queue; and
configuring a second document processor of the plurality of document processors to begin performing topic extraction operations using a word at a second position of the circular queue, where the first position differs from the second position.

8. The system of claim 6, wherein determining the load of the each of the plurality of matrix processors comprises determining a sum of weights of words on the matrix processor.

9. The system of claim 6, wherein each of the one or more document processors is programmed to perform topic extraction operations based on a first word bundle and a second word bundle, the first word bundle corresponding to the first subset of the word set, the second word bundle corresponding to the second subset of the word set.

10. The system of claim 6, wherein sampling the set of one or more documents for one or more first topics includes performing Gibbs sampling on the set of one or more documents.

11. A computer program product, encoded on a non-transitory computer-readable storage device, operable to cause one or more document processors and a plurality of matrix processors to perform operations comprising:
  extracting a word-topic matrix from a set of one or more documents, the word-topic matrix including a plurality of topics of the set of one or more documents, wherein:
    each of the topics is defined at least in part by one or more words of a word set, each of the one or more words being associated with a probability, the word set being created from a word index of the set of one or more documents;
    the word-topic matrix is defined at least in part by a first dimension corresponding to the one or more topics and a second dimension corresponding to the word set;
    words in the word set are allocated to the plurality of matrix processors by:
      determining a weight of each word in the word set by determining a number of document processors on which the word resides,
      determining a load of each of the plurality of matrix processors,
      sorting the words in the word set according to weights of the words, and
      iteratively allocating a word having a largest weight to a matrix processor having a least load;
    the matrix processors include:
      a first matrix processor programmed to store and process a first portion of the word-topic matrix corresponding to a first subset of the word set; and
      a second matrix processor programmed to store and process a second portion of the word-topic matrix corresponding to a second subset of the word set; and
    each of the one or more document processors is programmed to perform topic extraction operations and matrix exchange operations, the topic extraction operations to be performed in parallel to the matrix exchange operations, wherein:
      the topic extraction operations comprise sampling the set of one or more documents for one or more first topics using the first portion of the word-topic matrix stored at the first matrix processor; and
      the matrix exchange operations comprise at least one of:
        fetching, from the second matrix processor, the second portion of the word-topic matrix to be used in sampling the set of one or more documents for one or more second topics; or
        upon extraction of at least one second topic where the extracted second topic corresponds to a word in the second subset, requesting the second matrix processor to update the second portion of the word-topic matrix using the extracted second topic.

12. The product of claim 11, wherein
  the one or more document processors include a plurality of processors; and
  the method further comprises:
    organizing words in the word set as a circular queue;
    configuring a first document processor of the plurality of document processors to begin performing topic extraction operations using a word at a first position of the circular queue; and
    configuring a second document processor of the plurality of document processors to begin performing topic extraction operations using a word at a second position of the circular queue, where the first position differs from the second position.

13. The product of claim 11, wherein determining the load of the each of the plurality of matrix processors comprises determining a sum of weights of words on the matrix processor.

14. The product of claim 11, the operations further comprising configuring each of the one or more document processors to perform topic extraction operations based on a first word bundle and a second word bundle, the first word bundle corresponding to the first subset of the word set, the second word bundle corresponding to the second subset of the word set.

15. The product of claim 11, where sampling the set of one or more documents for one or more first topics includes performing Gibbs sampling on the set of one or more documents.

16. A method executed by one or more computers, comprising:
  allocating a first portion of a word-topic matrix to a first matrix processor, the word-topic matrix including a plurality of topics of a set of one or more documents, each topic comprising one or more words of a word set, each of the one or more words being associated with a respective probability, the word set comprising words from a word index of the set of one or more documents;
  allocating a second portion of the word-topic matrix to a second matrix processor, the second portion of the word-topic matrix being different from the first portion of the word-topic matrix, wherein words in the word set are allocated to the plurality of matrix processors by:
    determining a weight of each word in the word set by determining a number of document processors on which the word resides,
    determining a load of each of the plurality of matrix processors,
    sorting the words in the word set according to weights of the words, and
    iteratively allocating a word having a largest weight to a matrix processor having a least load;
  performing, on a document processor, topic extraction operations, the document extraction operations comprising sampling the set of one or more documents for one or more first topics using the first portion of the word-topic matrix stored at the first matrix processor; and
  performing, on the document processor, and in parallel to performing the topic extraction operations, matrix exchange operations, the matrix exchange operations comprising at least one of:
    fetching, from the second matrix processor, the second portion of the word-topic matrix to be used in sampling the set of one or more documents for one or more second topics; or
    upon extraction of at least one second topic wherein the extracted second topic corresponds to a word in the second subset, requesting the second matrix processor to update the second portion of the word-topic matrix using the extracted second topic.

17. The method of claim 16, further comprising:
  performing, at the document processor, topic extraction operations based on a first word bundle and a second word bundle, the first word bundle corresponding to the first subset of the word set, the second word bundle corresponding to the second subset of the word set.

18. The method of claim 16, wherein sampling the set of one or more documents for one or more first topics includes performing Gibbs sampling on the set of one or more documents.

19. The method of claim 16, wherein determining the load of the each of the plurality of matrix processors comprises determining a sum of weights of words on the matrix processor.

20. A computer program product, stored on a non-transitory computer-readable storage device, operable to cause one or more computers to perform operations comprising:
   allocating a first portion of a word-topic matrix to a first matrix processor, the word-topic matrix including a plurality of topics of a set of one or more documents, each topic comprising one or more words of a word set, each of the one or more words being associated with a respective probability, the word set comprising words from a word index of the set of one or more documents;
   allocating a second portion of the word-topic matrix to a second matrix processor, the second portion of the word-topic matrix being different from the first portion of the word-topic matrix, wherein words in the word set are allocated to the plurality of matrix processors by:
      determining a weight of each word in the word set by determining a number of document processors on which the word resides,
      determining a load of each of the plurality of matrix processors,
      sorting the words in the word set according to weights of the words, and
      iteratively allocating a word having a largest weight to a matrix processor having a least load;
   performing, on a document processor, topic extraction operations, the document extraction operations comprising sampling the set of one or more documents for one or more first topics using the first portion of the word-topic matrix stored at the first matrix processor; and
   performing, on the document processor, and in parallel to performing the topic extraction operations, matrix exchange operations, the matrix exchange operations comprising at least one of:
      fetching, from the second matrix processor, the second portion of the word-topic matrix to be used in sampling the set of one or more documents for one or more second topics; or
      upon extraction of at least one second topic wherein the extracted second topic corresponds to a word in the second subset, requesting the second matrix processor to update the second portion of the word-topic matrix using the extracted second topic.

21. The product of claim 20, the operations further comprising:
   performing, at the document processor, topic extraction operations based on a first word bundle and a second word bundle, the first word bundle corresponding to the first subset of the word set, the second word bundle corresponding to the second subset of the word set.

22. The product of claim 20, wherein determining the load of the each of the plurality of matrix processors comprises determining a sum of weights of words on the matrix processor.

23. The product of claim 20, wherein sampling the set of one or more documents for one or more first topics includes performing Gibbs sampling on the set of one or more documents.

* * * * *